Figure 6:
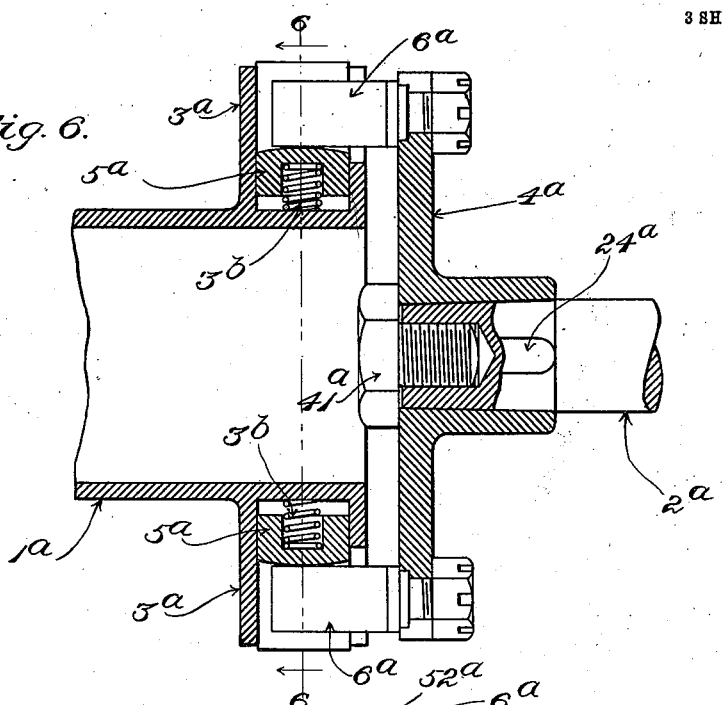

No. 847,439. PATENTED MAR. 19, 1907.
A. RITTER.
UNIVERSAL JOINT.
APPLICATION FILED APR. 16, 1906.
3 SHEETS—SHEET 1.
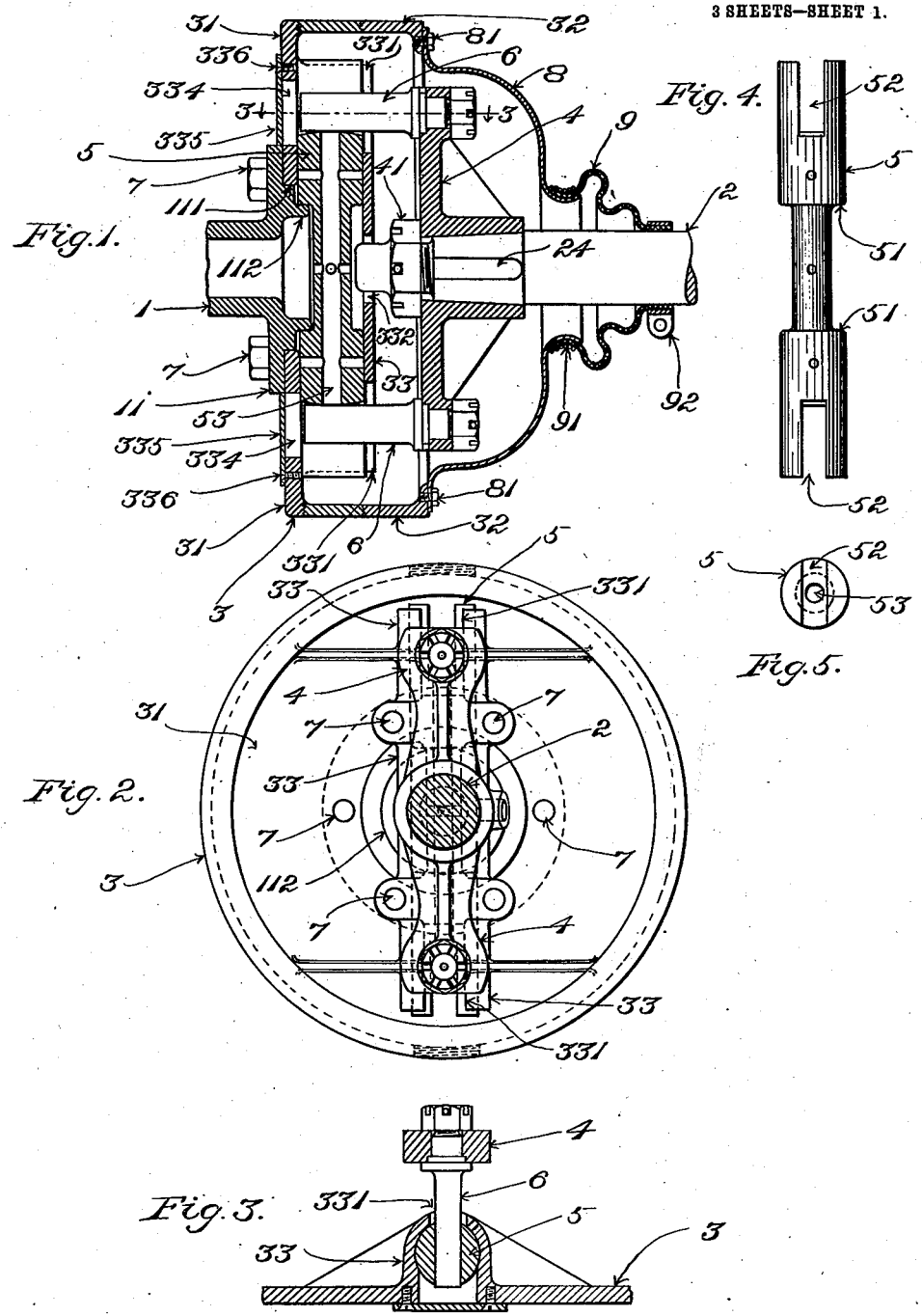

No. 847,439. PATENTED MAR. 19, 1907.
A. RITTER.
UNIVERSAL JOINT.
APPLICATION FILED APR. 16, 1906.

3 SHEETS—SHEET 2.

Witnesses:
Oscar F. Hill
Edith J. Anderson.

Inventor:
Albert Ritter
by Chas. F. Randall
Attorney.

No. 847,439. PATENTED MAR. 19, 1907.
A. RITTER.
UNIVERSAL JOINT.
APPLICATION FILED APR. 16, 1906.

3 SHEETS—SHEET 3.

Witnesses:
Oscar F. Hill
Edith J. Anderson

Inventor:
Albert Ritter
by Chas. F. Randall
Attorney.

# UNITED STATES PATENT OFFICE.

ALBERT RITTER, OF BOSTON, MASSACHUSETTS.

UNIVERSAL JOINT.

No. 847,439.

Specification of Letters Patent.

Patented March 19, 1907.

Application filed April 16, 1906. Serial No. 311,914.

*To all whom it may concern:*

Be it known that I, ALBERT RITTER, a citizen of Switzerland, residing at Jamaica Plain, Boston, in the county of Suffolk, State of Massachusetts, have invented a certain new and useful Improvement in Universal Joints or Universal-Angle Couplings, of which the following is a specification, reference being had therein to the accompanying drawings.

The general object of the invention is to provide a novel and improved universal joint or universal-angle coupling of simple, strong, and durable construction adapted for use in the propelling mechanism of automobiles, as well as fitted for employment in various other connections. One special object thereof is to provide a construction in which the power shall be transmitted on a large circle—that is to say, at the outer end of a radius of appreciable length—thereby lessening the tendency to wear, reducing the extent of the angular play or lost motion between the parts resulting from a given amount of wear, and giving more effective leverage than where the power is transmitted at points closely adjacent the axes of rotation.

Another special object is to provide a construction permitting relative movement of the coupling members in the direction of the length of the shaft-sections which are connected thereby in order to accommodate a limited extent of movement of one of such shaft-sections in the direction of its length. Such a movement occurs in the case of the transmitting-shaft of an automobile, extending from its connections with the engine-shaft near the front of the automobile to the gearing for the rear axle. Heretofore this movement has been compensated for by making the said shaft telescopic, as by forming the same in two sections, one thereof having a square tenon entering a square socket in the other. In such cases, however, the leverage has been too small for advantageous action, and the tendency to wear has resulted speedily in angular play or lost motion.

The first feature of the invention consists in operatively combining the two coupling-heads or the equivalents thereof of a universal joint or universal-angle coupling with each other by means of telescoping universal-joint connections.

The invention consists, further, in a universal joint or universal-angle coupling comprising, essentially, a connector-swivel carried by one of the said coupling-heads and mounted with capacity to turn transversely upon an axis which is radial or diametrical with relation to that upon which the said coupling-head rotates, and a connector-arm carried by the other coupling-head, disposed eccentrically with relation to the axis upon which the latter rotates, extending in the direction of the said axis and engaging with the said swivel with capacity for relative movement in the direction of the length of the connector-arm. For light work a single connector-arm, &c., will be sufficient. For heavier work and when it is desired to distribute and divide up the strain a plurality of connector-arms and a suitable arrangement of swivel or swivels to correspond therewith will be employed.

Figure 7:
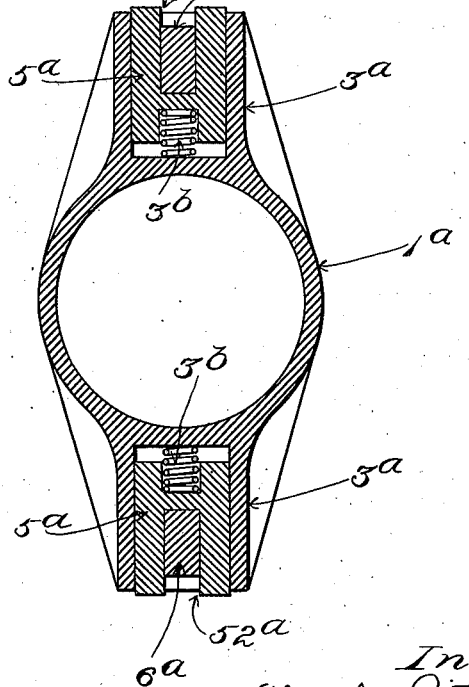
Figure 8:
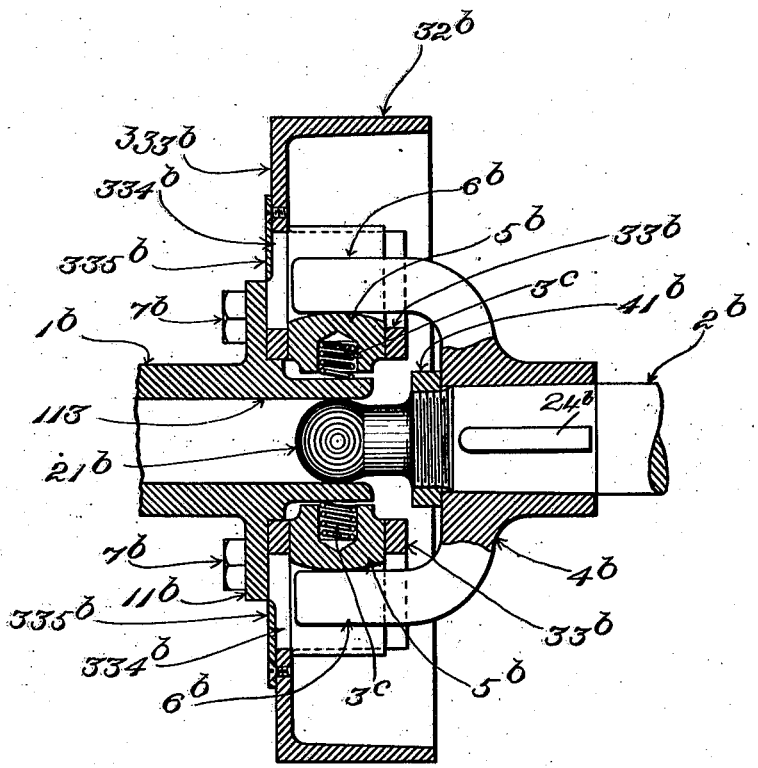

In the drawings, Figure 1 is a view of a universal joint or universal-angle coupling containing an embodiment of the invention, showing the same mainly in section in a vertical plane passing through the center of the coupling and extending in the direction of the axes of the shaft-sections. Fig. 2 is a view looking from the right-hand side in Fig. 1 with a shaft-section shown in cross-section and with certain portions of the casing removed. Fig. 3 is a detail view in horizontal section on line 3 3 of Fig. 1. Fig. 4 shows in elevation, separately, the connector-swivel of Figs. 1, 2, and 3. Fig. 5 shows an end elevation of the said swivel. Fig. 6 is a view similar to Fig. 1, showing a second embodiment of the invention. Fig. 7 is a view in vertical transverse section in the plane indicated by the dotted line 6 6 of Fig. 6. Fig. 8 is a view similar to Fig. 1, showing a third embodiment of the invention.

Having reference to the drawings, Figs. 1 to 5 show a construction containing a diametrical connector-swivel that is carried by one coupling-head and two connector-arms that are carried by the other coupling-head and which engage with opposite ends of the said connector-swivel. In such figures, 1 and 2 are shaft-sections, from one of which motion is to be communicated to the other. 3 and 4 are coupling-heads, one thereof being connected with the shaft-section 1 and the other with the shaft-section 2. 5 is the connector-swivel, it being carried by the coupling-head 3, and 6 6 are the connector-arms, mounted opposite each other upon the coupling-head 4. Shaft-section 1 in this instance is tubular for the sake of lightness and is formed with a radial flange 11 at one end thereof, having at the outer side thereof a circumferential shoulder 111 of less diameter than the main web of the flange. Coupling-head 3 is formed with an annulus 31, which fits upon the said shoulder against the outer face of the flange. It is attached to the latter by means of bolts 7 7 7, &c., and is formed with a peripheral rim 32, extending laterally therefrom and inclosing the connections. It is formed with a socket portion 33, in this instance constituted of a shell, within which is a cylindrical chamber, the said chamber extending diametrically of the said coupling-head and containing the connector-swivel 5. The latter is formed with cylindrical end portions having a turning fit within the chamber aforesaid and is reduced in diameter along the intermediate portion of its length, leaving shoulders 51 51, Fig. 4, extending around the connector-swivel at opposite sides of the middle of such length, which shoulders receive between them the projecting rim 112 upon the end of shaft-section 1. The exterior of the said rim constitutes a circular shoulder, which by engagement with the shoulders 51 51 prevents the connector-swivel from moving in the direction of its own length, although leaving the same free to turn upon its own longitudinal axis. The opposite end portions of the connector-swivel are formed with open-ended longitudinal slots 52 52, receiving the connector-arms 6 6. The inner ends or bottoms of the said slots are crowned or convexed to accommodate the inclined positions which are assumed by the connector-arms when the axes of the shaft-sections have an inclination with relation to each other. Coupling-head 4 consists of a cross-head sleeved upon shaft-section 2 and having the arms thereof extending at opposite sides of the said shaft-section. The connector-arms 6 6 in this instance are constituted by pins which project from the opposite arms of coupling-head 4, parallel with the axis of shaft-section 2, toward the coupling-head 3. The said pins are rigidly affixed to the cross-head. They are detachably inserted in holes in the cross-head and are secured in place by means of nuts which are applied to the screw-threaded ends thereof. Each thereof occupies one of the slots in the connector-swivel and has the opposite sides thereof flattened to fit the side walls of the said slot. Shell 33 is slotted radially at 331 331 at its opposite ends for the passage of the connector-arms therethrough, the slots being sufficiently wide to accommodate the amount of side play of the connector-arms which is required in order to permit the desired extent of inclination of the shaft-sections with respect to each other. The sleeve or hub portion of the coupling-head 4 fits upon the end portion of the shaft-section 2 and is interiorly tapered to fit the corresponding taper of the said end portion, the extremity of the latter being screw-threaded and receiving a cap-nut 41, by means of which the said hub is held tightly against its tapered seat upon the said shaft-section. 24 is a key by means of which the coupling-head 4 and shaft-section 2 are compelled to turn in unison. At 8 is a casing-section surrounding the coupling-head 4 and a portion of the shaft-section 2, it being secured by its outer flange to an inwardly-turned lip of the rim 32. A section of flexible material, as 9, surrounds the outer portion of the casing-section 8 and the shaft-section 2 and is made fast to the former by a wrapping 91, of cord or wire, and to the latter by means of a clamp 92.

In practice a quantity of vaseline or other lubricant will be placed within the coupling-head 3 and casing-section 8, filling these latter more or less completely. The surfaces which act against one another will be kept in good working condition by the access of the said lubricant thereto. To insure access of the said lubricant to the different contacting surfaces of the connector-swivel, the latter is bored longitudinally, as at 53, and also has a number of radial holes extending from the surface thereof inward to and intersecting the longitudinal bore. Certain of these holes are located in the reduced middle portion of the length of the connector-swivel, and others thereof are located in the enlarged end portions of the latter. Lubricant placed within the said longitudinal bore or finding its way into the same will pass out through the radial holes to the surfaces of the said connector-swivel, which make contact with the wall of the chamber within which the connector-swivel is contained and with the rim 112 and also will pass at the ends of such bore between the bottoms of the end slots 52 52 in the connector-swivel and the connector-arms 6 6. A hole 332, formed through the shell 33 and receiving the projecting portion of the cap-screw 41, permits access of the lubricant to the middle portion of the said shell. The end of cap-nut 41 projects into the said hole, so that in case of breakage of one or both of the connector-arms the engagement of the said end with the edge of the hole will limit the extent of movement of one shaft-section transversely with relation to the other thereof, and thus will act to prevent one shaft-section from dropping out of place with relation to the other.

In operation when rotary motion of one of the shaft-sections is occasioned the engagement of the connector-swivel and connector-arms with one another causes movement of rotation to be transmitted from such shaft-section to the other. As the parts rotate if the shaft-sections are inclined more or less with relation to each other the connector-swivel will rock or turn on its longitudinal axis to accommodate the different angles of inclination of the arms 6 6 transversely with relation to such axis at the different points in one rotation, while a certain amount of relative shift of the connector-arms 6 6 longitudinally within the end slots 52 52 of the connector-swivel will take place as the rotation of the connector-heads in planes which are inclined with respect to each other causes corresponding points on the two connector-heads to approach and then separate from each other. To accommodate the relative endwise movement of the connector-arms, holes are made at 334 334 in the coupling-head 3. These holes are closed by a cover or covers 335 335, secured in place by means of screws 336 336. The slots 52 52 permit the radial tilting of the connector-arms within the same, which is due to the inclination of one shaft-section with relation to the other. It has been explained that engagement of the shoulders 51 51 of the swivel 5 with the shoulder 112 of shaft-section 1 prevents endwise movement of the said swivel. It follows from this that by the contact of the connector-arms 6 6 with the bottoms of slots 52 52 the coupling-head will be restrained from movement in the direction of the length of the swivel, while the contact of the sides of the said connector-arms with the opposite side walls of such slots will prevent movement of the coupling-head 4 transversely with relation to the length of the swivel. Hence if shaft-section 2 is unprovided with a bearing-support adjacent the coupling or universal joint the corresponding end thereof will be sustained by means of the universal-joint connections. Conversely, the proximate end of shaft-section 1 will be supported thereby if unprovided with a bearing.

Figs. 6 and 7 illustrate a construction in which one of the shaft-sections is formed with radial sockets, which take the place of a separate coupling-head, and short radial swivels are employed, one for each connector-arm. In such figures the shaft-sections are marked $1^a$ and $2^a$, respectively, the former thereof being provided with the radial sockets, which are designated $3^a$ $3^a$, and the other thereof being provided with the coupling-head $4^a$, carrying the connector-arms $6^a$ $6^a$. Within the radial sockets are sustained the short radial swivels $5^a$ $5^a$, one for each connector-arm, the respective swivels being formed with open-ended slots $52^a$ $52^a$, which are entered by the respective connector-arms. The walls of the sockets $3^a$ $3^a$ are slotted on the sides thereof adjoining the coupling-head $4^a$ to permit the required extent of transverse play of the connector-arms. The inner end of each swivel is socketed and receives the outer portion of an expanding spiral spring $3^b$, the inner end of which bears against the bottom of the chamber of the socket $3^a$. The spring is compressed between the swivel and the said bottom and acts by its expansive force to hold the rounded bottom of the slot $52^a$ of the swivel pressed against the inner edge of the corresponding connector-arm. The springs $3^b$ $3^b$ enable the swivels to accommodate themselves to a certain extent of displacement of the axis of one shaft-section out of line with that of the other. Each swivel rocks or turns upon a radial axis, and in the case of each swivel and its connector-arm relative movement in the direction of the length of such connector-arm takes place in the rotation of the parts when the shaft-sections are inclined more or less with relation to each other. In Fig. 6 at $41^a$ is a screw with a flanged head, serving to hold the hub of coupling-head $4^a$ in firm engagement with its tapered seat upon shaft-section $2^a$, and $24^a$ is a key or spline by which the said hub is prevented from turning upon the said shaft-section.

In the embodiment of the invention which is shown in Fig. 8 the shaft-sections are designated $1^b$ and $2^b$, respectively, the radial flange of the former being marked $11^b$, and the coupling-head that is attached to the said flange by the bolts $7^b$ $7^b$ being designated $333^b$, its peripheral rim being marked $32^b$. In this embodiment, $5^b$ $5^b$ are radial swivels located at opposite sides of shaft-section $1^b$ and contained in slotted shells $33^b$ $33^b$, with which the coupling-heads $333^b$ is formed, springs $3^c$ $3^c$ being interposed between the inner ends of such swivels and the extension 113 of the shaft-section $1^b$, the said springs being contained for the greater portion of their length within holes or sockets which are formed in the inner ends of the swivels. The said springs operate to press the swivels outward, so as to keep the bottoms of the slots thereof pressed against the inner edges of the connector-arms $6^b$ $6^b$. In this instance the said connector-arms are integral with the hub of the coupling-head $4^b$. At $24^b$ is the key or spline by which the said coupling-head is prevented from turning upon shaft-section $2^b$. At $334^b$ $334^b$ are the holes which are made in the coupling-head $3^b$ to permit the relative endwise movement of connector-arms $6^b$ $6^b$. To hold the shaft-sections with their axes in line with each other, the shaft-section $2^b$ is formed or provided with a prolongation or extension beyond the screw-threaded portion thereof which receives the nut $41^b$, by which the hub of coupling-head $4^b$ is held upon such shaft-section. This prolongation or extension enters the bore of shaft-section $1^b$ and fits therein. It is made spherical in shape to permit the two shaft-sections to occupy various inclined positions with relation to each other.

I do not restrict myself in all cases to slotting the swivel itself for the reception of the connector arm or arms, inasmuch as the engagement of the connector arm or arms with the swivel or swivels with capacity for relative longitudinal movement and radial swinging may be provided for in other or equivalent manner, nor do I restrict myself to the precise arrangements which are shown and described herein of the connector-arms and swivels with relation to each other or with respect to the number thereof.

Having explained the best modes in which I have thus far contemplated carrying the invention into effect, I claim—

1. In a universal joint or universal-angle coupling, the combination with two coupling-heads, of a longitudinally-slotted connector-swivel carried by one thereof and arranged to turn around a radial or diametrical axis, and a rigid connector-arm upon the other coupling-head, disposed eccentrically with relation to the axis of rotation of the latter, extending through the slot of the said swivel.

2. In a universal joint, or universal-angle coupling, the combination with a coupling-head provided with a rigid connector-arm extending in the direction of the length of the axis of rotation of the said coupling-head, of a second coupling-head, and a longitudinally-slotted connector-swivel connected therewith, arranged to turn around a radial or diametrical axis, and having the said connector-arm engaged in the slot thereof.

3. In a universal joint or universal-angle coupling, the combination with the coupling-heads, of oppositely-located connector-arms rigidly mounted upon one of the said heads and extending in the direction of the axis of rotation of such head, and a connector-swivel carried by the other of said heads, arranged to turn transversely upon an axis extending diametrically of the latter head, and having opposite slots extending lengthwise of the said axis and receiving the said connector-arms.

4. In a universal joint or universal-angle coupling, the combination with a coupling-head having connector-arms rigidly mounted thereon and extending in the direction of the length of the axis of rotation of the said coupling-head, of the second coupling-head provided with a diametrical connector-swivel mounted with capacity to turn transversely on the said second coupling-head and having the opposite ends thereof engaged with the respective connector-arms with capacity for relative movement in the direction of the length of the latter, and means to hold the said connector-swivel from movement in the direction of the axis thereof.

5. A universal joint or universal-angle coupling comprising opposite coupling-heads, a swivel connected with one thereof adapted to turn or roll transversely with relation to a radius or diameter of such coupling-head, and having a longitudinal slot with crowned or rounded inner end, and a rigid connector-arm upon the other coupling-head, occupying the slot of the said swivel and contacting with the said inner end.

6. A universal joint or universal-angle coupling comprising opposite coupling-heads, a diametrical connector-swivel connected with one thereof and having the oppositely-located longitudinal slots with crowned or rounded inner ends, and the rigid connector-arms upon the other coupling-head, occupying the slots of the said connector-swivel.

7. A universal joint or universal-angle coupling comprising opposite coupling-heads, rigid connector-arms carried by one of the said coupling-heads and engaged with the other thereof to cause the two heads to rotate in unison, and a central projection in connection with one of the coupling-heads entering a socket in connection with the other thereof to keep the two coupling-heads properly centered with respect to each other.

8. A universal joint or universal-angle coupling comprising opposite coupling-heads, a diametrical connector-swivel carried by one thereof and having longitudinal slots, means to hold such connector-swivel from longitudinal displacement, and rigid connector-arms carried by the other of the said coupling-heads and making contact with the inner ends or bottoms of the said slots.

In testimony whereof I affix my signature in presence of two witnesses.

ALBERT RITTER.

Witnesses:
CHAS. F. RANDALL,
EDITH J. ANDERSON.